United States Patent
Kameda et al.

[11] 3,978,268
[45] Aug. 31, 1976

[54] ELECTROCONDUCTIVE ELASTIC SPONGE MEMBER

[75] Inventors: Hiromi Kameda, Toyokawa; Sanji Inagaki, Okazaki, both of Japan

[73] Assignee: Minolta Camera Kabushiki Kaisha, Osaka, Japan

[22] Filed: Oct. 17, 1974

[21] Appl. No.: 515,758

[30] Foreign Application Priority Data
Oct. 23, 1973 Japan............................ 48-119514
Aug. 13, 1974 Japan............................ 49-93129

[52] U.S. Cl. .............................. 428/368; 355/3 R; 427/74; 427/88; 428/408; 428/425; 219/216
[51] Int. Cl.² ............................................. B32B 9/04
[58] Field of Search .......... 428/425, 367, 368, 408; 427/74, 88

[56] References Cited
UNITED STATES PATENTS

| | | |
|---|---|---|
| 2,872,340 | 2/1959 | Newman et al. ...................... 428/408 |
| 2,962,386 | 11/1960 | Doll et al. ........................ 428/408 X |
| 3,721,595 | 3/1973 | Tarnopol ........................ 428/425 X |
| 3,752,695 | 8/1973 | Finelli ............................ 428/425 X |
| 3,809,603 | 5/1974 | Kooi et al. ......................... 428/425 |
| 3,830,656 | 8/1974 | Takenaka et al. ................... 428/425 |

*Primary Examiner*—Harold Ansher
*Assistant Examiner*—Patricia C. Ives
*Attorney, Agent, or Firm*—Wolder & Gross

[57] ABSTRACT

An electrophotographic copying machine of the image transfer type includes a roller for pressing the copy image receiving substrate into virtual contact with the electrostatic image carrying drum. The roller includes a metal shaft and an outer layer formed of an electroconductive elastic sponge material having a resistivity of $10^2$ to $10^6$ ohm/cm which varies inversely with the compression of the material. The sponge material is produced by soaking an open pore soft polymeric sponge matrix temporarily expandable when exposed to alcohol in a liquid composition containing 10 parts of a water dispersable resin binder, 2 to 7 parts of a fine electroconductive powder and 10 to 200 parts of alcohol, expressing the excess liquid and then drying the liquid composition.

10 Claims, 5 Drawing Figures

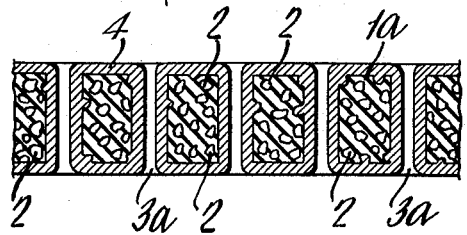
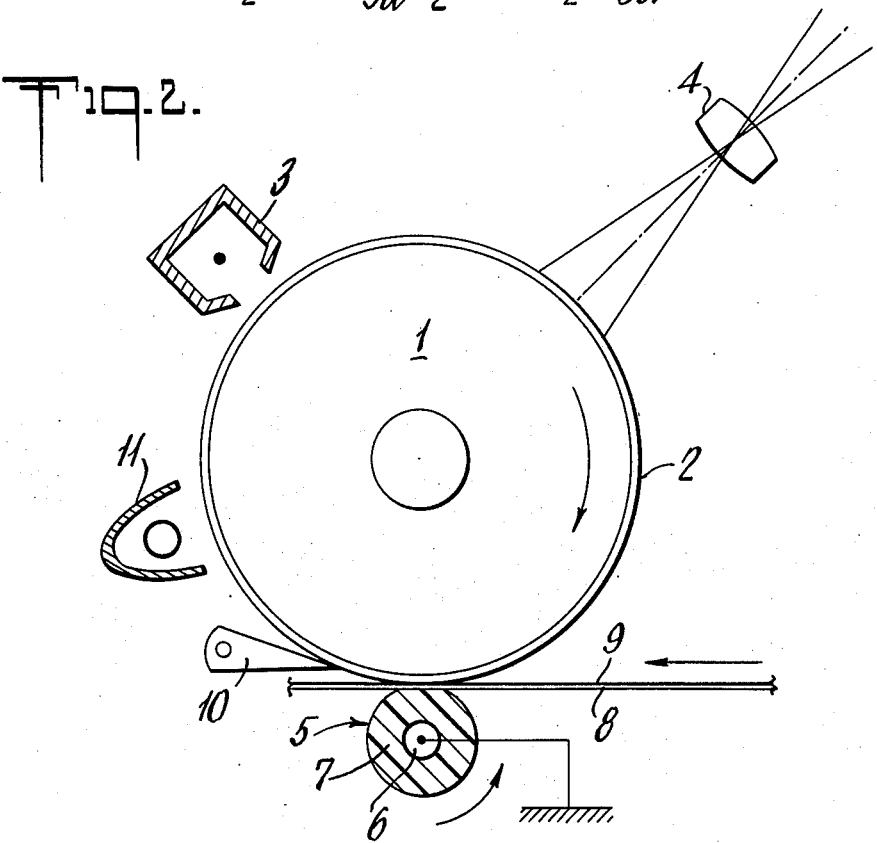
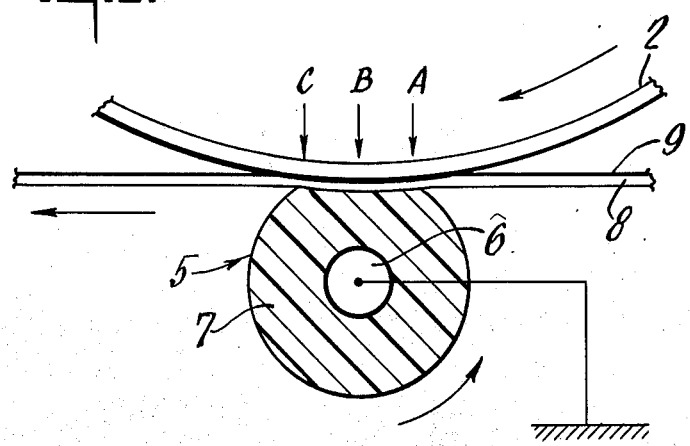

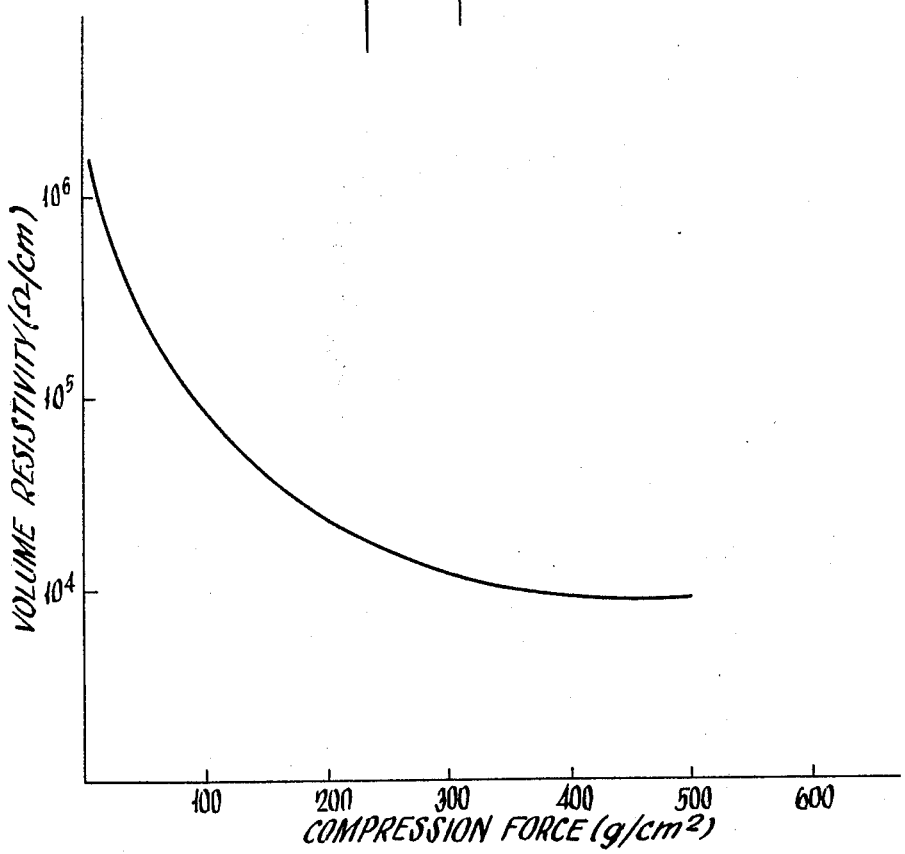
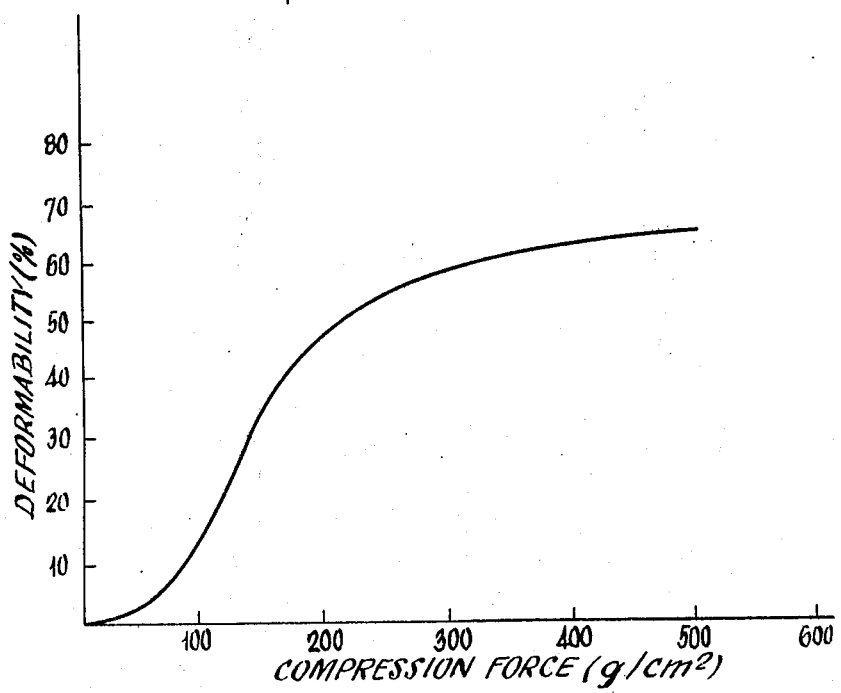

007
ELECTROCONDUCTIVE ELASTIC SPONGE MEMBER

BACKGROUND OF THE INVENTION

The present invention relates generally to improvements in resilient electroconductive members, and it relates more particularly to an improved electroconductive elastic sponge member having an electrical resistivity in the range of $10^2$ to $10^6$ ohm/cm and possessing fine pliability and fine compression restorability, and it relates further to an electroconductive elastic sponge member for use in the field of electrophotography, such as in an electrostatic latent image transfer mechanism.

Conventionally, an electroconductive member in the form of a plate, roller or belt has been used in devices for electrophotography, printing, spinning and the likes for antistatic and for electrostatic charge injection purposes. Specifically in electrophotographic copying machines, an electroconductive member is used to remove excess electrostatic charge from a copy paper and/or to transfer an electrostatic latent image formed on a suitable photosensitive plate or substrate to a copy paper. Such electroconductive members are commonly prepared by coating or kneading an antistatic agent mainly comprising an anionic, cationic, or nonionic surfactant on an elastic material such as natural rubber, synthetic rubber or a synthetic resin.

However, the electroconductive elastic member thus obtained has a relatively high electrical resistivity of $10^{15}$ to $10^7$ ohm/cm due to the employment of an ion or salt for electroconductivity, and the electrical resistivity thereof is quite unstable in long use.

To overcome these defects and to obtain the desired electrical resistivity, it is known to incorporate a fine electroconductive powder, such as of carbon black, aluminum, silver, nickel, copper or the like, into an elastic material in place of the aforesaid antistatic agent to obtain an electroconductive elastic member. However, incorporation of such fine electroconductive powder impairs the softness and pliability of the elastic member, rendering it hard and brittle and low in elasticity The elastic member having such properties, when used in a form of roller or belt, possesses the disadvantages of high deficiencies in flexibility, elasticity, durability and transformability and thus fails to assure a uniform contact with relatively weak pressure against an opposing member with which it is urged into contact. Furthermore, when the electroconductive coating is formed over the surface of an elastic member, the coating is likely to separate from a base member thereby impairing the durability.

To assure a highly elastic, uniform contact pressure, an elastic sponge member having a low electric resistivity may be made by adding large amounts of a highly electroconductive material, such as metal powder and a foaming agent such as ammonium carbonate, diazoaminobenzene, hydrazide benzensulfonate or the like, to a synthetic rubber or like elastic material and foaming the resulting mixture, but the fine metal powder greatly reduces the elasticity of the resulting sponge product and its ability to effect intimate contact. Thus it is impossible to obtain a sponge-like elastic product having numerous uniform pores therein.

In the field of electrophotography, particularly in an electrophotographic copying apparatus of the electrostatic latent image transfer type, a metallic member or an electroconductive rubber member in the form of a roller has hitherto been used as an image transfer means. Specifically, these transfer means are either electrically grounded or applied with a bias potential and placed in contact with the surface of an image forming photosensitive plate with a copying paper inserted therebetween to transfer an electrostatic latent image to a copy paper.

However, with the use of a metallic roller as an image transfer means; (1) the phtosensitive plate bearing the latent image is subject to a heavy pressure of at least few kg/cm² by the metallic roller for firm contact of the copy paper with the surface of the photosensitive plate resulting in damage to the plate. (2) The contacting area of the metallic roller with the surface of photosensitive plate is quite narrow and small due to the non-elastic nature of the metallic roller and this results in the uncertain migration of the electrostatic charges from the image bearing photosensitive member to the copy paper at the time of transfer. Accordingly, a non-uniform transfer is effected under this unstable and non-uniform transfer condition with a copy paper which is also subject to deformation caused by environment changes resulting from changes in temperature, humidity, etc. (3) A sudden and rapid injection of electrostatic charges to the copy paper is likely to occur at the initial stage of transfer and this will cause abnormal discharge phenomenon which results in the non-uniform transfer of the image.

To overcome these defects, the use of an electroconductive rubber roller has been proposed for this roller which is placed over a photosensitive plate with less force as compared with the metallic roller thereby overcoming the first defect mentioned above. Further, because of the elastic nature of this rubber roller, an electrostatic latent image is transferred under improved conditions. While this rubber roller is superior to the metallic roller in the above respects, it not only fails to overcome the third defect of the metallic roller mentioned above, but also has the following distinctive disadvantages in which; (1) a plasticizer added in the electroconductive rubber roller to bestow elasticity exudes at the surface of the roller consequent to environment changes and lapse of time, and tends to adhere on a copying paper or photosensitive plate to cause contamination thereon. (2) The elastic property of electroconductive rubber roller is poor in restorability subsequent to the release from compression contact with the opposing photosensitive plate, and the size of roller undergoes changes in long use which adversely affects the image transfer conditions. (3) The surface of electroconductive rubber roller is likely to be affected by ozone generated by the associated corona discharge device which ozone is transported thereto by the accompanying air flow caused by the rotation of a photosensitive plate and becomes tacky to adversely affect the copy paper and photosensitive plate.

SUMMARY OF THE INVENTION

It is accordingly a principal object of this invention to provide an improved electroconductive elastic sponge member having an electrical resistivity in the range of $10^2$ to $10^6$ ohm/cm.

It is another object of this invention to provide an electroconductive elastic sponge member of fine pliability and compression restorability.

It is another object of this invention to provide an electroconductive elastic sponge member with its electrical resistivity variable in accordance with a change in compressibility.

It is still another object of this invention to provide a novel electroconductive elastic sponge member for use in the image transfer section of an electrophotographic copying machine.

Pursuant to the present invention, the above and other objects are accomplished by the provision of a novel electroconductive elastic sponge member comprising a base material of a soft foam temporarily swellable or expandable by alcohol and an electroconductive coating formed by incorporating in the base material an additive electroconductive agent containing a suitable mixture of a water dispersable, that is, a water soluble or emulsifying binding resin, a fine electroconductive powder and alcohol.

For a fuller understanding of the nature and objects of the present invention, reference is made to the following detailed description taken in conjunction with the accompanying drawings.

BRIEF DESCRIPTION OF THE DRAWINGS

FIG. 1 is an enlarged fragmentary view of an electroconductive elastic sponge member in accordance with the present invention;

FIG. 2 is a schematic view of an electrophotographic copying apparatus embodying the present invention;

FIG. 3 is an enlarged view of a part of FIG. 2; and

FIG. 4 and FIG. 5 are graphs illustrating properties of a sponge member embodying the present invention.

DESCRIPTION OF THE PREFERRED EMBODIMENTS

An electroconductive elastic sponge member according to the present invention has been developed to satisfy the following conditions in which the sponge member has (1) an electroconductivity of $10^2$ to $10^6$ ohm/cm, (2) a pliable elastic character, (3) at least 80 percent restoratability of the elastic member subsequent to release from the application of pressure, (4) a simple and nonpolluting process of manufacture and (5) a good binding or adhesive characteristic between the base material and treating agent.

To satisfy the above conditions, the present invention contemplates the use of an elastic sponge member, such as a continuous open-cellular or reticulated cushion material, as a base and treating this base with an electroconductive additive agent to obtain the electroconductive elastic sponge or reticular member. Specifically, the base material selected for the device of the present invention may be of any soft foam adapted to temporarily swell or expand when treated with alcohol and generally includes a polyether or polyester type soft polyurethane foam. To this alcohol pretreated base, an electroconductive additive composition or agent is uniformly mixed and dispersed, the agent comprising a water soluble or emulsive resin, a fine electroconductive powder and alcohol. The water soluble or emulsive resin provides pliability to the coating and acts as a binding agent for fine binding between the electroconductive coating and the base material. The water soluble or emulsive resin may be an aminoalkyd, phenolalkyd, aminoacryl, acrylic ester, methacrylic acid, polyvinyl alcohol, polyacrylic acid resin, acrylic acetic vinyl copolymer, rubber latex, polyethyren, vinylidene chloride, vinyl acetate, or acryl resin. The fine electroconductive powder may be of any electroconductive material such as carbon black, acetylene black, graphite, silver, nickel, copper and the like. The alcohol may be of either methyl alcohol or ethyl alcohol.

As for the ratio of the three components of the additive composition, it varies in accordance with the desired electroconductivity. More specifically, the weight ratio between the binding agent and the fine electroconductive powder influences the electroconductivity, and the dilution ratio by alcohol also tends to vary the electroconductivity. Further, the electroconductivity is dependent on the material selected as the fine electroconductive powder. If, acetylene black is used, only one third part by weight of this is needed to obtain the same electroconductivity as compared to one part by weight of carbon black. Thus, to obtain an electroconductive elastic sponge member having an electrical resistivity of $10^2$ to $10^6$ ohm/cm, the component or ingredient ratio of the composition should be 10 parts by weight of binding agent, 2 to 7 parts by weight of electroconductive fine powder and 10 to 200 parts by weight of alcohol. For the sake of comparison, to obtain an electroconductive elastic sponge member having a electrical resistivity of $10^2$ to $10^{12}$ ohm/cm, the mixing ratio for the additive agent should be such that to 10 to 50 parts by weight of binding agent, 2 to 30 parts by weight of the fine electroconductive powder and 10 to 200 parts by weight of alcohol should be mixed.

It is noted that while preparing or dispersing the electroconductive additive agent, a plasticizer such as butyl phthalate, a bridging agent such as hydroperoxite or antioxidant may be added at maximum of 10 parts by weight therein to improve the final product to be obtained.

To manufacture the improved electroconductive elastic sponge member, a spongy base material as described above is immersed or dipped in the electroconductive additive agent or else the agent is sprayed onto the sponge foam. This causes the agent to permeate into the foam with the aid of the alcohol and binding agent and simultaneously the foam temporarily expands. This expansion allows a uniform coating of the agent on the base surface (which is filamentary fibrous like) since its surface tends to become drenchy. After 2 to 5 minutes of immersion, the electroconductive spongy elastic product thus obtained is heated at a temperature of 50° to 100°c for about 10 to 60 minutes or simply left at a room temperature for sufficient time until dried.

Alcohol combined in the electroconductive additive agent not only enhances the mixing and dispersion of the binding resin for the film formation over the spongy base material and the fine electroconductive powder for attaining electroconductivity, but also functions to permeate said additive agent into the base quickly and uniformly. Furthermore, as the alcohol has the property to expand the base temporarily, alcohol may easily be removed by drying after the additive agent has permeated into the base, whereby the base contracts from its expansion to strongly bind the electroconductive coating which consists of binding resin and electroconductive fine powder with the base. This also prevents the generation of foam or bubbles during immersion of the base in the additive agent which causes nonuniform binding of the electroconductive coating with the base.

If the product desired to be manufactured is a foam roller, an iron core with the spongy base wrapped around may be used, since the electroconductive agent would permeate the base to the core to maintain electroconductivity between the agent and core. Here the agent also acts as adhesive between the two.

An example of an electroconductive elastic sponge member thus obtained is shown in FIG. 1 wherein 1a designates a closed cellular foamed material having numerous closed cells 2 and formed with numerous piercing pores 3a fully extending therethrough. The foam 1a is coated with the electroconductive additive agent 4 in the form of an aqueous solution and the final product thus obtained is impregnated with the solution 4 which penetrates into the pores 3a.

EXAMPLE 1

| Compound | Parts by weight |
|---|---|
| Acrylic ester | 15 |
| Carbon black | 10 |
| Anion activator (mixture of naphthalene sulfonic soda and formalin condensate) | 50 |
| Ethyl alcohol | 25 |

The above compounds are sufficiently mixed and dispersed and into this dispersion solution, an ester type polyurethane foam is immersed and heat dried for 30 minutes at a temperature of 80°c after being removed from the solution. The electroconductive elastic sponge member thus obtained has a volume resistivity of $2 \times 10^3$ ohm/cm and a pliability the same as that prior to treatment.

EXAMPLE 2

| Compound | Parts by weight |
|---|---|
| Acrylic acetic vinyl copolymer | 20 |
| Carbon black | 10 |
| Anion activator | 50 |
| Ethyl alcohol | 50 |

The same procedure and conditions are employed as in Example 1, and the electroconductive elastic sponge member thus obtained has a uniform resistivity of $2 \times 10^4$ ohm/cm and is of a highly pliable body.

EXAMPLE 3

| Compound | Parts by weight |
|---|---|
| Acrylic ester | 12 |
| Acetylene black | 3 |
| Methyl alcohol | 150 |

These compounds are thoroughly mixed and into the resulting solution, an ester type polyurethane foam is immersed and after squeezing out excess solution with a pair of rollers, it is heat dried for 30 minutes at a temperature of 50°C. The electroconductive elastic sponge product thus obtained had a resistivity of $3 \times 10^2$ ohm/cm and a hardness of 11.5kg/314 cm² which is substantially the same as prior to treatment.

EXAMPLE 4

| Compound | Parts by weight |
|---|---|
| Acrylic ester | 10 |
| Acetylene black | 3 |
| Methanol | 100 |

The same procedure and conditions are employed as in Example 1 with the exception that the drying temperature was 50°C and the product had an electrical resistivity of $10^3$ ohm/cm and was of pliable body.

EXAMPLE 5

| Compound | Parts by weight |
|---|---|
| Acrylic ester | 10 |
| Acetylene black | 2 |
| Ethyl alcohol | 10 |

The same conditions and procedure was employed as in Example 1. The electroconductive elastic sponge member thus obtained had a uniform volume resistivity of $1.5 \times 10^5$ ohm/cm and a hardness of 10kg/314cm² which is substantially the same as the pliability prior to treatment.

EXAMPLE 6

| Compound | Parts by weight |
|---|---|
| Acrylic ester | 10 |
| Acetylene black | 6 |
| Methanol | 200 |

The same conditions and procedure were employed as in Example 1. The electroconductive elastic sponge member thus obtained had a uniform volume resistivity of $2 \times 10^6$ ohm/cm and a hardness of 11.5kg/314cm² which is of the same pliability as compared with the hardness of polyurethane foam prior to this treatment.

EXAMPLE 7

| Compound | Parts by weight |
|---|---|
| Acrylic acetic vinyl copolymer | 40 |
| Carbon black | 15 |
| Butyl phthalate | 10 |
| Methanol | 200 |

The same conditions and procedures were employed as in Example 1, with the exception that 40 minutes of heat drying were applied. The product thus obtained had a volume resistivity of $1.8 \times 10^5$ ohm/cm and a hardness of 8kg/314cm² which is of satisfactory pliability.

EXAMPLE 8

| Compound | Parts by weight |
|---|---|
| Acrylic ester | 5 |
| Acetylene black | 10 |
| Methanol | 100 |

The same conditions and procedures were employed as in Example 1. The product thus obtained had a relatively poorer binding with the electroconductive additive solution.

EXAMPLE 9

| Compound | Parts by weight |
|---|---|
| Acrylic ester | 55 |
| Acetylene black | 2 |
| Methanol | 100 |

The same conditions and procedures were employed as in Example 1. The product thus obtained had a volume resistivity of $1.5 \times 10^{13}$ ohm/cm and a hardness of 10.5kg/314cm². Here the resistivity is too high for satisfactory use as an image transferring means.

The electroconductive elastic sponge members obtained in Examples 1 to 7 are applicable for use in any field that requires an antistatic mechanism. However, it was discovered that this electroconductive spongy elastic member in the form of a roller is particularly useful in the field of electrophotography as an electrostatic latent image transfer means. This is so mainly because the electrical resistivity of the member is dependent on the compression factor, since the member itself uses a spongy foam as its base. In other words, this member exhibits change in resistivity by the application of pressure thereonto for the foam in compressed state introduces a decrease in resistivity which leads to an improvement in the electroconductivity. This characteristic and other advantages which were noted above, make this electroconductive spongy elastic member particularly useful as an image transferring means.

An embodiment of an electrostatic copying machine of the image transfer type using the improved member is explained in detail with reference to FIGS. 2 to 5.

Referring now to FIG. 2, a photosensitive member 1 in the form of a drum having photosensitive layer 2 is supported and driven to rotate in the direction of the arrow by a suitable driving means, not shown. The drum 1, as it rotates, is uniformly charged by a corona discharge device 3 and exposed to an original to be reproduced through a lens 4 to an electrostatic latent image thereon. Reference numeral 5 designates an image transferring mechanism in the form of a roller and comprises of iron shaft 6 with an electroconductive elastic layer 7 obtained from one of the examples described above. The image transferring roller 5 is in contact with the surface of the photosensitive drum 1 and the shaft thereof 6 is electrically grounded as shown. The image transfer roller is adapted to be rotated in the direction of arrow in synchronization with, and at the same peripheral speed as the rotation of the drum 1. A copy paper to which an image is transferred comprises a conductive base 8 overcoated with a dielectric layer 9 and transported between the drum 1 and the image transfer roller 5 in the direction shown by the arrow. The copy paper carrying the transferred electrostatic latent image is separated from the drum 1 by a peeling means 10 and is further transported for development. The drum 1, on the other hand, continues its rotation and the residual charges on its surface are erased by erasing means 11.

The image transfer roller 5 includes the electroconductive elastic layer 7 obtained through the process described above and having (1) a hardness of 2 to 50kg/3 14cm², (2) a density of 0.02 to 0.05 g/cm³, (3) a repetitive restorability subsequent to release from compression of at least 80%, preferably greater than 95% and (4) an electroconductivity of $10^2$ to $10^6$ ohm/cm. These and other characteristics are achieved by making use of the electroconductive spongy elastic member described above.

Refering to FIG. 3, the image transfer roller 5 presses the copy paper on the photosensitive layer 2 bearing a latent image with a pressure of about 350 to 500 g/cm². However, at point A and at its neighboring area, the compression force of the roller 5 against the photosensitive layer 2 is only about 10 g/cm² and the deformability of the elastic layer 7 is about 1%. This would mean from FIG. 3 and FIG. 4 that the volume resistivity of the layer 7 at point A is as high as $10^6$ ohm/cm which prevents the injection of charges into the copying paper 8. But as the copying paper 8 is transported, that is to point B or to its neighboring area, where the paper and the drum are in virtual contact, a transfer of the latent electrostatic image is effected as the compression force exerted on the copying paper by the roller 5 reaches about 350 to 500 gm/cm² which means that the deformation factor of the electroconductive layer 7 is about 50 to 60% and the volume resistivity decreased to about $10^4$ ohm/cm as seen from FIGS. 4 and 5. At this point, injection of charges begins to transfer the electrostatic latent image. At point C, no further injection of charges is effected because of the increase of volume resistivity due to the change in compression force by the roller 5. A preferable compression at C is about 50 g/cm² which means the deformation factor is about 4% and the volume resistivity is more than $10^5$ ohm/cm.

According to an experiment performed by the inventors, a fine transferred image with no non-uniform transfer phenomenon was achieved with a maximum surface potential of only about 120 volts. Here the image was transferred from a photosensitive member having an electrostatic capacity of 110 PF/cm² with the surface potential of 1200 volts to a copying paper having an electrostatic capacity of 400 PF/cm².

As is clear from the foregoing description, an image transferring means in accordance with the present invention possesses advantages over the prior art devices, including that (1) the pressure applied on the photosensitive member by the present improved means is far less than electroconductive rubber roller and as it is formed of a far softer material than the rubber roller, damage to the photosensitive member is avoided; (2) the contacting area of the present means with the opposing photosensitive member is far greater than prior transfer means which assures the reliable transfer of the electrostatic image; (3) the present means prevents abnormal discharge phenomena at the beginning and the end of transfer, thereby eliminating any sudden injection of charges, and (4) a restorability of the present means subsequent to release from compression is nearly 100% and thus assures long even use of the device.

While there have been described and illustrated preferred embodiments of the present invention, it is apparent that numerous alterations, omissions and additions may be made without departing from the spirit thereof.

We claim:

1. An electroconductive elastic sponge member having an electrical resistivity in the range of $10^2$ to $10^6$ ohm/cm which varies inversely with the pressure applied thereto comprising a foamed organic polymeric base material temporarily expandable by methyl or ethyl alcohol and coated with an electroconductive additive agent including a mixture of 10 parts by weight of a water dispersable binding resin, 2 to 7 parts by weight of a fine electroconductive powder and 10 to 200 parts by weight of said base material expandable alcohol.

2. An electroconductive elastic sponge member as claimed in claim 1 wherein said binding resin is selected from the group of resins consisting of aminoalkyd, phenolalkyd, aminoacryl, acrylic ester, methacrylic acid, polyvinyl alcohol, polyacrylic acid, acrylic acetic vinyl copolymer, rubber latex, polyethylene, vinylidene chloride, vinyl acetate and acryl resin, and said electroconductive powder is selected from the group consisting of carbon black, acetylene black, graphite, silver, nickel and copper.

3. An electroconductive elastic sponge member having an electrical resistivity of $10^2$ to $10^6$ ohm/cm which varies inversely with the pressure applied thereto comprising a foamed soft polyurethane base material temporarily expandable by ethyl or methyl alcohol and coated with an electroconductive additive agent comprising a mixture of 10 parts by weight of a water dispersable binding resin, 2 to 7 parts by weight of a fine electroconductive powder selected from the group consisting of carbon black and acetylene black, and 10 to 200 parts by weight of said alcohol.

4. An electroconductive elastic sponge member having a resistivity which varies inversely with the pressure applied thereto comprising a porous elastic matrix having passageways extending between the opposite faces thereof and formed of a soft polymeric material which is temporarily expandable by the application of ethyl or methyl alcohol thereto, the surfaces of said matrix passageways being coated with an electroconductive powder dispersed in a resin binder by the application to said matrix of said electroconductive powder and binder dispersed in said alcohol.

5. The sponge member of claim 4 wherein said sponge member has a resistivity of $10^2$ to $10^6$ ohm/cm.

6. An electroconductive elastic sponge member having an electrical resistivity in the range of $10^2$ to $10^6$ ohm/cm comprising a polyester or polyether type polyurethane foam temporarily expandable by methyl or ethyl alcohol and coated with an electroconductive additive agent including a mixture of a water dispersable binding resin selected from a group consisiting of aminoalkyd, phenolalkyd, aminoacryl, acrylic ester, methacrylic acid, polyvinyl alcohol, polyacrylic acid resin, acrylic acetic vinyl copolymer, rubber latex, polyethylene, vinylidene chloride, vinyl acetate, or acryl resin, a fine electroconductive powder selected from a group consisting of carbon black, acethylene black, graphite, silver, nickel, copper, and methyl or ethyl alcohol wherein the mixture ration of said ingredient is 2 to 7 parts by weight of said electroconductive powder and 10 to 200 parts by weight of said alcohol for every 10 parts by weight of said water dispersable binding resin.

7. The electroconductive elastic sponge member of claim 6 having a hardness in the range of 10 to 11.5 Kg/314cm$^2$.

8. The electroconductive elastic sponge member of claim 6 wherein said resistivity is variable inversely with the pressure applied to said member.

9. The method of producing an electrically conducting elastic sponge material comprising applying to a soft elastic open pore sponge matrix formed of a polymeric material which is temporarily expandable when ethyl or methyl alcohol is applied thereto, a liquid composition including 10 parts by weight of a water dispersable resin binder and 2 to 7 parts by weight of a finely divided electroconductive powder dispersed in 10 to 200 parts by weight of said alcohol and thereafter evaporating said alcohol to leave a coating of said electroconductive powder and binder in the surface of said sponge matrix.

10. The method of producing an electrically conducting elastic sponge material comprising immersing a soft elastic open pore sponge matrix formed of an ester type polyurethane foam into a solution containing proportionately 12 parts by weight of acrylic ester, 3 parts by weight of acethylene black and 150 parts by weight of methyl alcohol, expressing excess solution from said matrix and drying said matrix for about 30 minutes at about 50°C.

* * * * *